(12) United States Patent
Sharpe

(10) Patent No.: US 6,307,441 B1
(45) Date of Patent: Oct. 23, 2001

(54) SHAPE MODULATION TRANSMIT LOOP WITH DIGITAL FREQUENCY CONTROL AND METHOD FOR SAME

(75) Inventor: Claude Andrew Sharpe, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/224,532

(22) Filed: Dec. 31, 1998

Related U.S. Application Data

(60) Provisional application No. 60/070,213, filed on Dec. 31, 1997.

(51) Int. Cl.$^7$ .................................................. H04L 27/10
(52) U.S. Cl. ......................... 332/100; 331/18; 375/272; 375/274; 375/303; 375/305; 327/106; 327/159
(58) Field of Search ..................................... 375/272, 303, 375/305, 274, 306, 376; 332/100; 331/18; 327/106, 107, 159, 162

(56) References Cited

U.S. PATENT DOCUMENTS 4,748,640 * 5/1988 Staley et al. ..................... 375/272

\* cited by examiner

*Primary Examiner*—Arnold Kinkead
(74) *Attorney, Agent, or Firm*—Ronald O. Neerings; Wade J. Brady, III; Frederick J. Telecky, Jr.

(57) ABSTRACT

A shape modulation transmit loop with digital frequency control permits spectral shaping of a digital pulse stream (12) by controlling the slew rate of the transition signal (16) between successive pulses. The loop is formed when the digital data stream is fed into an up/down counter (152) whose output is coupled to a programmable memory means (154), such as RAM, EEPROM, flash memory or similar electronic storage means. The output (108) of the programmable memory (154) forms a first input to an adder (112) which drives an accumulator (52) with specified steps. Values corresponding to the desired waveform (70) are stored in a lookup table (60) which is coupled to a digital-to-analog conversion circuit (64) which uses the values in the lookup table (60) to construct a sine wave output signal (70) corresponding to the frequency set by the current specified step of the up/down counter (152).

23 Claims, 3 Drawing Sheets

SHAPE MODULATION TRANSMIT LOOP WITH DIGITAL FREQUENCY CONTROL AND METHOD FOR SAME

This amendment claims priority under 35 USC §119(e)(1) of provisional application number 60/070,213, filed Dec. 31, 1997.

TECHNICAL FIELD

The present invention relates in general to an integrated circuit for modulating signals and more particularly to an integrated circuit device and related method for spectral shaping of a digital pulse stream by controlling the slew rate of the transition signal that occurs as a result of instantaneous changes between successive pulses.

BACKGROUND OF THE INVENTION

The background is described in connection with an improved modulator useful in cellular telephony applications using a modified Direct Digital Synthesizer (DDS). It should be understood, however, that the principles disclosed may apply to a wide array of applications where component space is limited and a digital implementation of the signal modulation circuitry would help decrease overall component count and/or limit system board space requirements.

Inductors, capacitors and other passive components are essential elements of many electronic devices. Such components are used to perform a variety of functions such as filtering, inter-stage impedance matching, and decoupling of AC and DC signals. For example, in cellular communications such components are used to transmit, receive and filter a modulated analog signal carrier into its audible voice signal counterpart. With the move to smaller and lighter devices, a premium is often placed on the size and number of components in the design.

Modulation is the function which imposes certain characteristics to an electromagnetic signal based on a set of rules and the data to be transmitted. One common modulation technique is known as Frequency Shift Keying (FSK). With FSK modulation, an output signal is switched between two separate frequencies with a higher frequency Nhigh representing a "mark" frequency and a lower frequency Nlow representing as the "space" frequency. Thus, a data train can be reconstructed from an analog signal by modulating the signal in time between "marks" and "spaces."

The basic FSK modulation scheme 10 is illustrated in FIG. 1 wherein the digital data stream 12 (101101) and its corresponding FSK counterpart 14 are shown. Note that the switching from a "mark" to a "space" occurs almost instantaneously causing a series of abrupt discontinuities 16 in the data stream 12. The discontinuities 16 in the data stream 12 consume a frequency spectrum of a theoretical infinite range since the rate of change of the signal 12 over time approaches infinity. This rate of change is often referred to as the slew rate and expressed as the mathematical equivalent dv/dt.

SUMMARY OF THE INVENTION

The large frequency spectrum inherent to modulation schemes such as FSK 10 dictates the use of components capable of accommodating instantaneous signal changes. In high frequency application, precise switching is a critical performance characteristic. Often, numerous precision components such as external filters, inductors and capacitors are used to provide enough bandwidth for the modulation spectrum and to limit interference with bands adjacent to modulated signal. The use of such components, however, increase total component count as well as the size of the device circuit board.

A more gradual change of the date stream 12 would relax the requirements of the external components or in some applications eliminate the need for filtering components all together. The resulting waveform would approximate the signal designated B as shown in FIG. 1b. Thus, a device and method for smoothing out the transition between "marks" and "spaces" in a controlled manner would require less spectrum and reduce the number of external components used in the modulation system.

Accordingly, the present invention provides a digital method and integrated circuit for generating a modulated signal with decreased frequency spectrum requirements that limits the number of external components in the system.

In accordance with one embodiment of the invention, a device known as a Direct Digital Synthesizer (DDS) is modified to provide a shaped FSK modulation signal which controls a shape modulation transmit loop. The DDS is generally comprised of counters, memories, digital-to-analog convertors and other standard components which are used to synthesize the signal waveform. The frequency of the signal is set by an accumulator which is incremented through a sequence using specified steps at a fixed clock rate. The larger the step size the sooner the sequence will be terminated. Higher frequencies are obtained by completing a greater number of sequences within the same period. As such, almost instantaneous lock time is achieved by eliminating external filtering components used with prior art signal modulators since the DDS has virtually no settling time as compared to prior art phase lock loops and bandpass filters.

In one embodiment, a large phase accumulator is used providing virtually infinitely small channel spacing.

In another embodiment, the digital modulator of the present invention forms a variable filter that mimics the functionality of a wide array of data filters (such as Gaussian, Chebyshev, Bessel, Butterworth and others) allowing the spectral shape to be optimized for a large number of data transmission systems.

In still another embodiment, a single chip synthesizer/transmitter/modulator useful as a high speed GSM transmit module is provided.

Disclosed in one embodiment is a shape modulation transmit loop with digital frequency control which permits spectral shaping of a digital pulse stream by controlling the slew rate of the transition signal between successive pulses. The loop is formed when the digital data stream is fed into an up/down counter whose output is coupled to a programmable memory means, such as RAM, EEPROM, flash memory or similar electronic storage means. The output of the programmable memory forms a first input to an adder which drives an accumulator according to specified steps. The word output of the accumulator, in turn, becomes the second input to the accumulator. Values corresponding to the desired waveform are stored in a lookup table which is coupled to a digital-to-analog conversion circuit (DAC). The DAC uses the values in the lookup table to construct a sine wave output signal corresponding to the frequency set by the action of the up/down counter, programmable memory means, adder and accumulator.

The invention can be a method of reducing the slew rate in transition from a first RF frequency to a second RF frequency comprising: generating a digital transition ramp;

determining at least one digital value which is a function of instantaneous amplitude of the first frequency; combining the transition ramp and the at least one digital value which is a function of instantaneous amplitude of the first frequency to generate a series of ministeps; and using the ministeps to control an analog to digital converter to generate a controlled transition from the first RF frequency to the second RF frequency.

Other aspects and advantages of the invention including its specific implementations are understood by reference to following detailed description taken in conjunction with the accompanying drawings.

BRIEF DESCRIPTION OF THE DRAWINGS

In the drawings.

Corresponding numerals in the figures refer to corresponding parts unless otherwise indicated.

DETAILED DESCRIPTION OF THE PREFERRED EMBODIMENTS

Figure 1A:
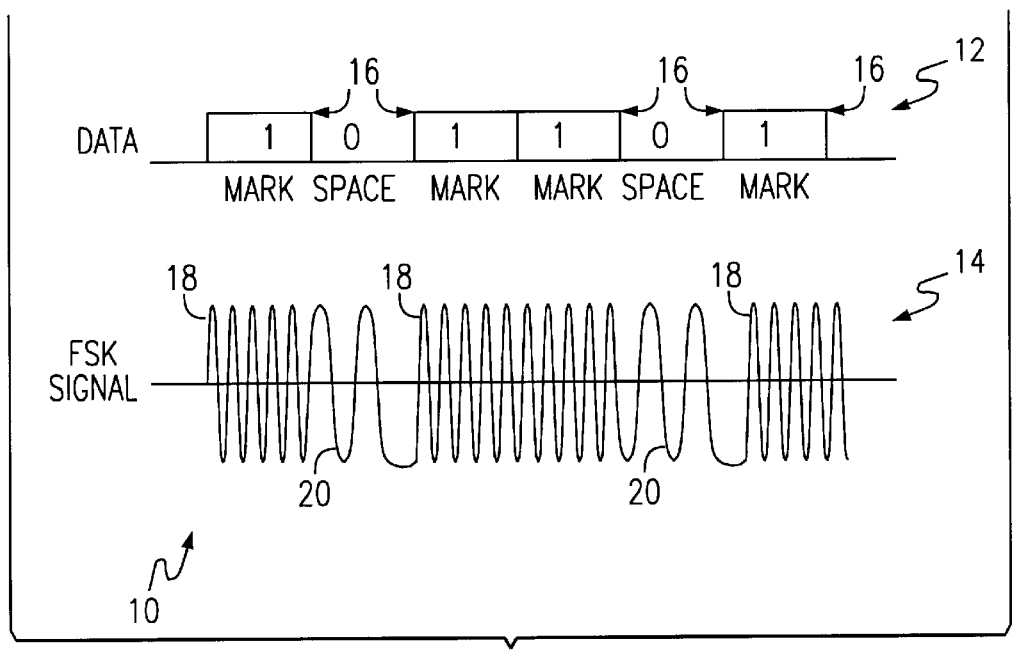
FIG. 1a shows a data diagram and its corresponding FSK equivalent.

As referenced above, FIG. 1a illustrates the basic principles of Frequency Shift Keying (FSK) with a digital data stream 12 and its corresponding FSK signal 14. The data stream 12 comprises a series of "marks" and "spaces" and may form an 8-bit, 16-bit or other serial length sequence corresponding to the data to be transmitted. The transitions 16 occur instantaneously with changes in the data stream 12. The corresponding FSK signal 14 is comprised of higher frequencies 18 and lower frequencies 20 which, in turn, correspond to "marks" and "spaces", respectively, in the data stream 12.

In operation, the FSK signal 14 is modulated between a high frequency 18 and a low frequency 20 prior to transmission in a data communications system. Several modulation schemes (e.g. rules dictating how the data stream 12 is modulated depending on the data) are employed. In cellular communications, for example, Gaussian Minimum Shift Keying (GMSK) has been adopted as the modulation method.

Figure 1B:
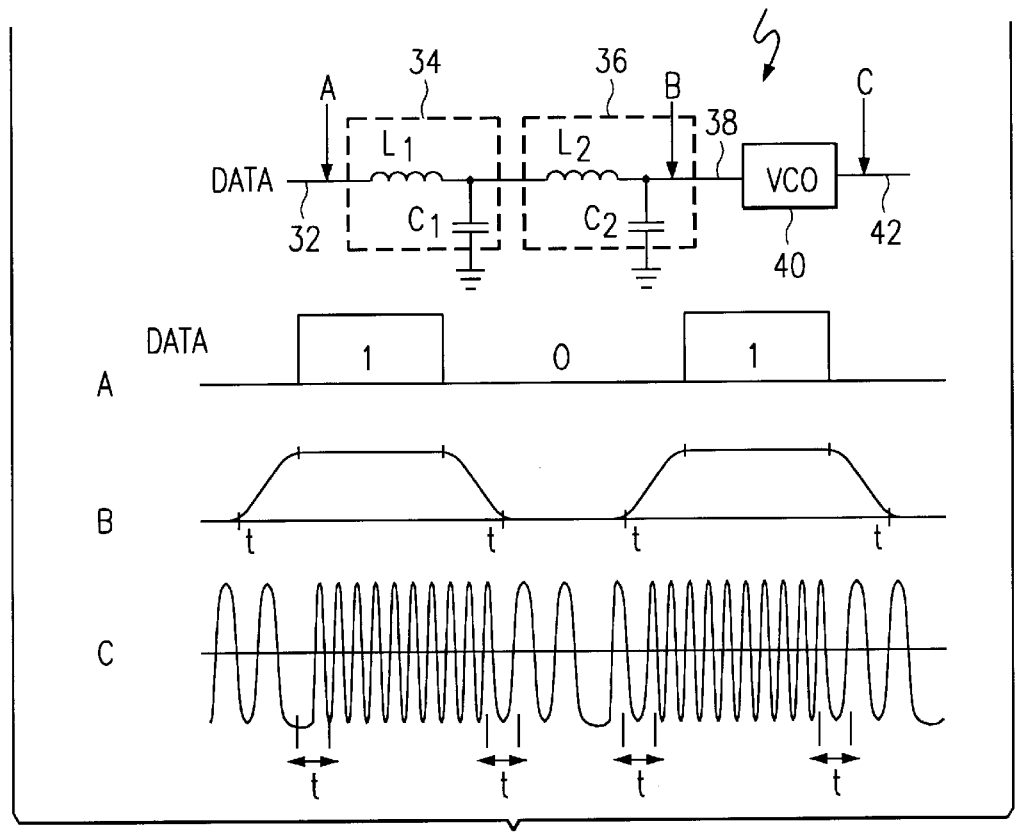
FIG. 1b shows a smoothed data pulse stream obtained using the a shaped modulation transmit loop.

Since the abrupt transitions 16 in the data stream 12 occur almost instantaneously, a much larger frequency spectrum is occupied than if the switching were to be done in a gradual controlled manner. In FIG. 1b, the pulse stream A is shown along with a more gradual counterpart B and the corresponding FSK signal C. The smooth pulses of signal B consume a much narrower frequency spectrum but permit data communications without sacrificing recovery of the underlying data. Recovery can be enhanced by sampling within the middle of the pulse after a known transition period. For example, a clock can be synchronized to sample the smooth pulse stream B in the middle of pulse.

A block diagram of a circuit model for producing the FSK signal C is also shown and denoted generally as 30 in FIG. 1b. Generally, a filter element is inserted between the incoming data stream and a Voltage Controlled Oscillator (VCO). Assuming a linear VCO, the output signal will be a shaped FSK signal. Such an implementation, however, requires numerous precision parts which consume valuable real estate on the system circuit board. Given the present size and weight requirements of modem electronic devices, a linear VCO implementation with numerous parts is not practical for modem applications.

As shown, the pure pulse data A enters at terminal 32 and reaches filters 34 and 36. Due to the time constants (LC) of the filters 34 and 36, a series of smooth pulses B are generated and fed into the input terminal 38 of the VCO 40. The frequency of the VCO 40 at terminal 38 is gradually raised and lowered by the filter elements 34 and 36. The VCO 40, in turn, produces the FSK signal C at output terminal 42.

A transition period (t) is the time when the FSK signal C slews from one frequency to another. As is known to those skilled in the art, with GMSK, the standard used in cellular telephone data switching, the data filter is specified to be a Gaussian filter with a BT of 0.3, a particular definition which results in an allowable amount of distortion of the transmitted data while drastically reducing the occupied bandwidth of the signal. Thus, the GMSK signal is distinct enough for accurate resolution even in noisy environments. Additionally, the VCO 40 output 42 can be synchronized with an external reference for error-free recovery of the underlying data stream by sampling after the transition period (t).

In actual cellular phones, the data 32/filter 34,36/VCO 40 combination is not a practical implementation. Rather, an equivalent technique using a balanced modulator can be used since it can be implemented in integrated circuit form using well known building blocks such as low power mixers, Digital-to-Analog Converters (DAC) and other standard components.

Figure 2:
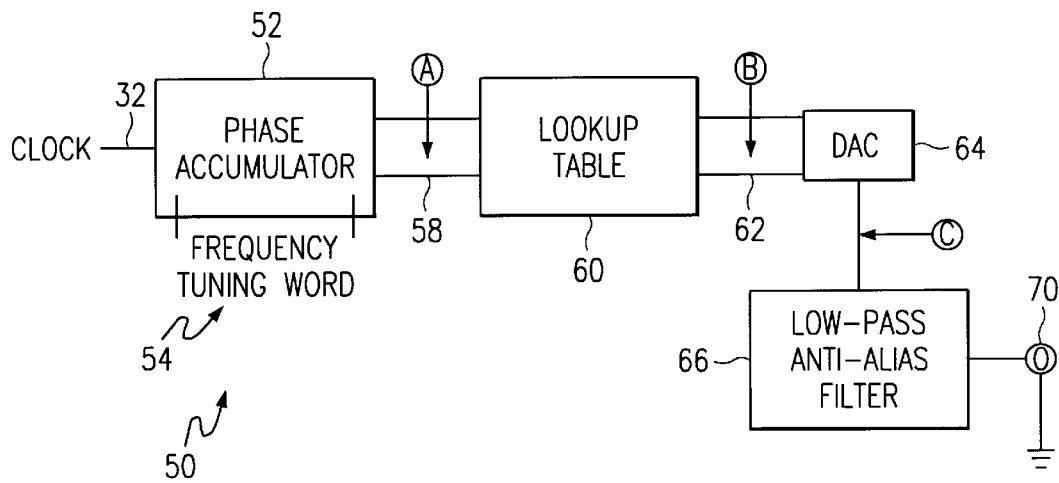
FIG. 2 is a block diagram illustrating the functionality of a Direct Digital Synthesizer (DDS)

With the development, however, of very large transistor arrays capable of operating at very high speeds, a superior technique of frequency generation is available using a device known as a Direct Digital Synthesizer (DDS). FIG. 2 shows a block diagram of a conventional DDS denoted generally as 50. Essentially, a DDS 50 synthesizes a waveform 70 using a combination of counters, memories and DAC conversion circuits rather than employing a VCO 40. The parameters of the synthesized waveform 70—frequency, phase and amplitude—are defined or calculated digitally.

The DDS 50 relies on the fact that any frequency can be defined as a change in phase per unit of time. A phase accumulator 52 is a variable-modulus counter designed to add a single number to the value already in the accumulator 52 every time the circuit 50 receives a clock pulse 80. The accumulator 52 defines the instantaneous phase point of the output waveform 70. When the accumulator counter overflows, another cycle of the waveform 70 starts.

A frequency tuning word 54 is shown as an input to the phase accumulator 52 which determines what number to add to the stored value already in the accumulator 52 with each clock pulse 80. Thus, the frequency tuning word 54 sets the counter modulus, and represents the "jump" size to the next point of the waveform 70. The size of the accumulator can vary to permit a large (e.g. large phase accumulator) or small number of increments.

Three parameters are used to determine the frequency of the waveform 70: the clock frequency, the phase accumulator bit size and the tuning input 54. The lookup table 60 contains the amplitude values that represent the sine wave output 70 at specific phase values. Phase values from the accumulator 52 tell the lookup table 60 which amplitude value to lookup next. Taking fewer phase jumps increases the synthesizer frequency while taking more phase jumps decreases the output frequency for a fixed clock frequency.

In one embodiment, the lookup table 60 is a digital phase-to-amplitude converter configured from a Read-Only Memory (ROM). The output of the phase accumulator 52 is applied to the ROM address bus 58 which, in turn, provides the DAC 64 with the corresponding amplitude value via bus 62. In one embodiment, enough data is stored in the lookup table 60 for the full 360° of phase values. In another embodiment, only 180° or 90° of sine-wave data is stored in the lookup table 60 to save space.

The DAC 64 creates an instantaneous amplitude sample for the desired RF signal. The DAC 64 receives its digital-word input from the lookup table 60. Following the DAC 64, an anti-alias filter 66 removes the alias signals, thereby providing a sine-wave signal 70 from the stair step waveform at the output of the DAC 66. Thus, the first analog signal appears at the output 70 of the DDS 50.

An important limitation of the DDS 50 to the range of frequencies that can be generated is that sample rate, or clock frequency 80, must be at least twice the output frequency as defined by the Nyquist theorem. For example, a 0-to-10 MHZ DDS must have a clock frequency of at least 20 MHZ. In reality, practical limitations may restrict the actual highest synthesized frequency to about ⅓ the clock frequency 80.

Figure 3:
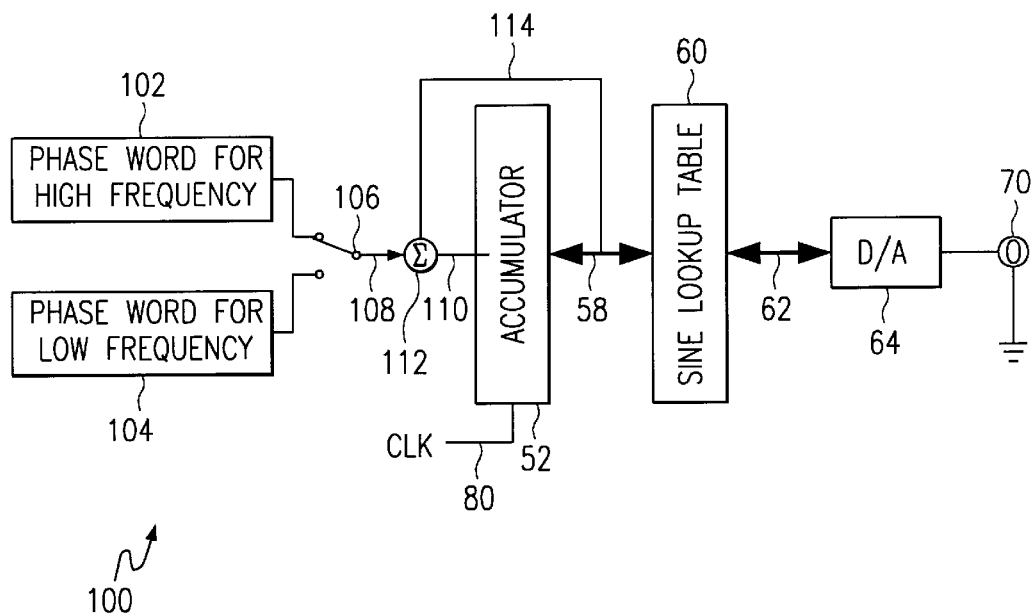
FIG. 3 is a circuit diagram of a prior art DDS.

In FIG. 3, a block diagram for a DDS circuit suitable for use as an FSK modulator is shown and denoted generally as 100. As noted above, the present value of the accumulator 52 is added to a specified step (e.g. the tuning word 54) as determined by the input 110 to the accumulator 52. The specified step, in turn, determines the output frequency of the sine-wave output 70.

Thus, if the specified step is always the same value, the output frequency will remain the same value. Likewise, if the specified step is changed to another value, the output frequency will be changed to another constant value.

The change in the specified step is achieved in DDS circuit 100 with a switch 106 which switches between at least two different word values 102 and 104. For FSK modulation, the word value 102 can be associated with a "mark" causing the specified step to decrease so that the frequency at output 70 of the DDS 100 increases. This would equate to and Nhigh value which would result in an output at the "mark" frequency.

Likewise, the input data could switch to word value 104 to increase the specified step to an Nlow frequency associated with a "space" in a FSK modulation scheme. Thus the switch to value 104 causes the frequency at output 70 to decrease.

In all cases, the specified step is input into the adder 112 via input terminal 108 and the word output 114 provides the second input to the adder. Since the output 70 of the DDS 100 depends on the specified step 110 into the accumulator, the switch 106 determines the current step size as well as the frequency of the sine-wave at output 70.

Figure 4:
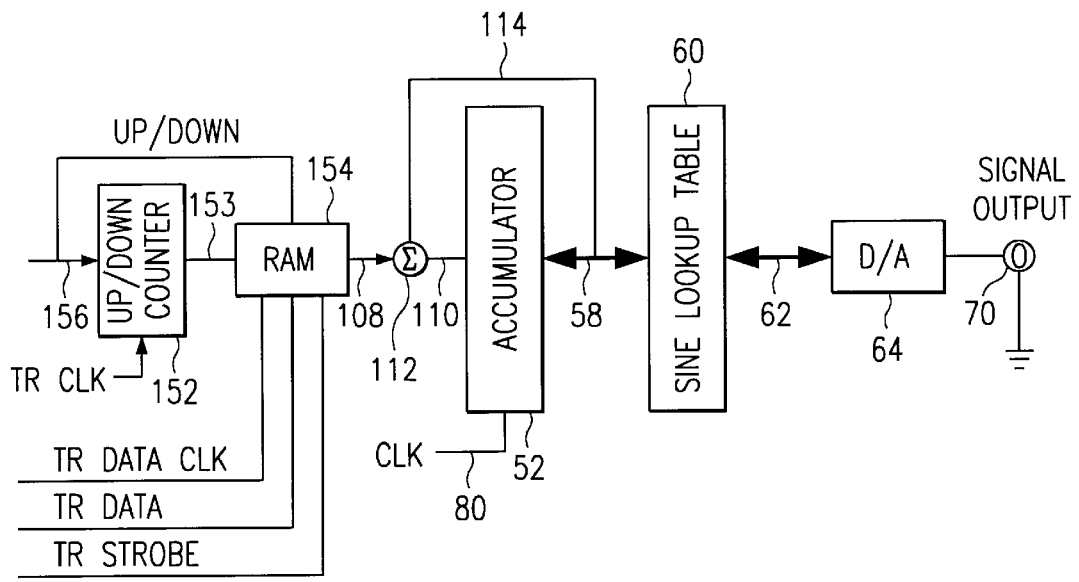
FIG. 4 is a circuit diagram of a spectral shaping DDS according to one embodiment of the invention.

The transition between the "mark" and "space" frequencies, however, still occurs more or less instantaneously leaving the bandwidth problems associate with prior art FSK modulators unchanged. Accordingly, FIG. 4 is a block diagram of a modified DDS system, denoted generally as 150, that provides spectral shaping for reducing the frequency spectrum requirements of an FSK modulator according to the invention.

As shown, an up/down counter 152 is provided and coupled to a programmable memory means 154 via signal path 153. Preferably, the up/down counter 152 is configured to count to a predetermined value. For example, the up/down counter 152 can be configured to counts up to 256 and stays there or counts down to 0 and stays there. For example, a "space" could be related to a logical ZERO value and a word "mark" related to 256 value.

The present value of the up/down counter 152 corresponds to the phase step which is input into the accumulator 52 via the adder 112. Spectral shaping of the sine-wave output 70 occurs since the frequency is now related to a specified step that is gradually changing as the frequency of the output signal 70 goes from Nhigh to Nlow or from Nlow to Nhigh.

Thus, the specified step value fed into the accumulator 52 during the transition period (t) is now a function of the value received from the up/down counter 152. The shape of the transition curve can be determined by the values stored in the programmable memory means 154. Possible shapes for the transition signal include a straight ramp, exponential or straight line according to various embodiments. In other embodiments, the accumulator 52, up/down counter 152, adder 112 and lookup table 60 can be configured to mimic the functionality of a wide array of data filters (such as gaussian, chebyshcv, bessel, butterworth and others) allowing the spectral shape to be optimized for a large number of data transmission systems.

Thus, the modified DDS 150 permits gradual changes between "marks" and "spaces", which reduces the spectral requirements of FSK modulator and eliminates the need for numerous precision to components to accommodate large slew rates associate with prior art modulators.

The shape modulation transmit loop with digital frequency control is formed by the combination of the up/down counter 152, programmable memory means 154, adder 112 and accumulator 52. The shape modulation transmit loop permits spectral shaping of the incoming digital data pulse stream 170 by controlling the slew rate of the transition signal between successive pulses. As shown, the digital data stream 170 is fed into the up/down counter input terminal 156 and the output 153 is coupled to the programmable memory means 154 which may comprise RAM, EEPROM, flash memory or similar electronic storage means.

The output 108 of the programmable memory means 154 forms a first input to the adder 112 which, in turn, drives the accumulator 52 according to steps specified by the present value of the up/down counter 152. The word output 114 of the accumulator 52 becomes the second input to the adder 112. Values corresponding to the desired waveform output 70 are stored in the lookup table 60 which is coupled to the DAC 64 by bus 62. The DAC 64 uses the values stored in the lookup table 60 to construct the a sine wave output 70 signal corresponding to the specified step set by the action of the up/down counter 152, programmable memory means 154, adder 112 and accumulator 52.

Thus, the modified DDS 150 can be used in a frequency modulation system for smoothing out the transition between "mark" pulses and a "space" pulses and thus reduce the frequency spectrum consumed by the instantaneous changes in the pulses. In essence, a series of mini-steps are generated that fit within the amplitude range defined by a "mark" pulse and said "space" pulse. The series of steps are then correlated to a corresponding series of phase values by sequential accumulation of the steps. Next, an analog signal amplitude counterpart is assigned to each phase value permitting the digital generation of an RF waveform having amplitude values and phase values as calculated. Since the series of steps are defined by the HIGH and LOW of the pulses, a slow gradual transition between pulses is achieved.

Figure 5:
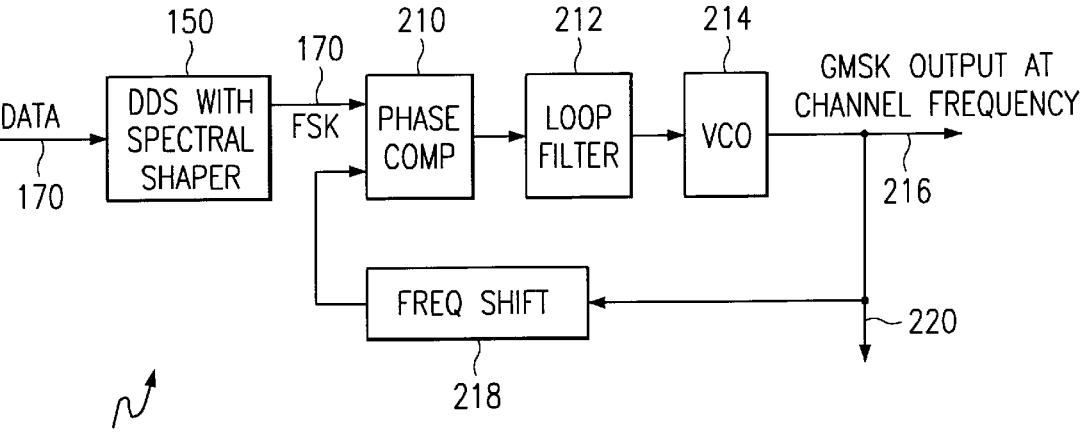
FIG. 5 is a block diagram of a high speed GSM transmit module using a DDS with internal spectral shaping.

In FIG. 5, a block diagram of a single chip synthesizer/transmitter/modulator useful as a high speed GSM (known as Global System for Mobile) using the modified DDS 150 with internal spectrum shaping is shown and denoted as 200. The data stream enters the DDS 150 at terminal 170 and the output constitutes a shaped FSK signal 70. For cellular phone applications, the data 170 most probably would originate from a digital signal processor or other similar processing means capable of generating a bit stream data representation of an audio speech pattern.

The output 70 of the DDS 150 can serve as a modulated reference signal if the DDS 150 is not capable of direct channel frequency generation. A phase comparator 210 compares the phase difference between the DSS output 70 and the output of the frequency shifter 218. A loop filter 212 is used to filter out any unwanted aliases in the data path with the VCO 214 providing the GMSK output at a predetermined channel frequency.

The phrase "circuitry" comprehends ASIC (Application Specific Integrated Circuits), PAL (Programmable Array Logic), PLA (Programmable Logic Array), decoders memories, non-software based processors, or other circuitry, or digital computers including microprocessors and microcomputers of any architecture, or combinations thereof. Words of inclusion are to be interpreted as nonexhaustive in considering the scope of the invention.

Internal and external connections, communications links circuit or signal pathways can be ohmic, capacitive, direct or indirect, via intervening circuits or otherwise. Implementation is contemplated in discrete components or fully integrated circuits in silicon, gallium arsenide, or other electronic material families. It should be understood that various embodiments of the invention can employ or be embodied in hardware, software or micro-coded firmware.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A pulse shape modulation transmit circuit for digitally reducing the frequency spectrum consumed by instantaneous changes in pulse values, said circuit comprising:

a counter which receives a digital pulse stream;

a programmable memory coupled to said counter;

an adder with first and second input terminals and an output terminal, said first input terminal coupled to said programmable memory;

an accumulator coupled to said output terminal of said adder and having an output coupled to said second input of said adder, said accumulator configured to increment a stored value by the value from said output terminal of said adder;

a lookup table coupled to said output of said accumulator and storing a plurality of waveform values which are related to the current output of said accumulator; and a digital-to-analog conversion circuit coupled to said lookup table and configured to create a shaped output waveform related to the present output value of said accumulator and the corresponding waveform value stored in said lookup table.

2. The shape modulation transmit circuit of claim 1 further comprising a clock signal coupled to said counter to control the counting function thereof.

3. The shape modulation transmit circuit of claim 2 wherein the frequency of said clock signal is at least twice the frequency of said shaped output waveform.

4. The shape modulation transmit circuit of claim 1 wherein the output of said accumulator is a word length output.

5. The shape modulation transmit circuit of claim 1 wherein said programmable memory comprises random access memory space.

6. The shape modulation transmit circuit of claim 1 wherein said lookup table is large enough to store a full 360° of phase values.

7. The shape modulation transmit circuit of claim 1 further comprising an anti-alias filter coupled to the output of said digital-to-analog conversion circuit for removing alias signals and generating an analog signal.

8. The shape modulation transmit circuit of claim 1 wherein said counter comprises an up/down counter that counts up to a predetermined value.

9. The shape modulation transmit circuit of claim 1 wherein said accumulator is a variable-modulus accumulator.

10. The shape modulation transmit circuit of claim 1 wherein said accumulator creates a plurality of phase values for said shaped output waveform and said values stored in said lookup table correspond to said phase values.

11. The shape modulation transmit circuit of claim 1 wherein said accumulator is large enough to accommodate a full set of 360° phase values.

12. A method of reducing the frequency spectrum consumed by the instantaneous changes in a digital data stream comprising:

generating a sequence of specified steps;

storing a plurality of values that determine the shape of the transition signal between pulses of said digital data stream in a programmable memory means;

feeding said specified steps into a said programmable means memory; and stepping through an entire cycle of said plurality of values by counting through a plurality of specified steps until reaching a predetermined value.

13. A method of reducing the frequency spectrum consumed by the instantaneous changes in a digital data stream comprising:

generating a sequence of specified steps;

storing a plurality of values that determine the shape of the transition signal between pulses of said digital data stream in a memory means;

feeding said specified steps into said memory means;

feeding the output from said memory means to an adder; and stepping through an entire cycle of said plurality of values by counting through a plurality of specified steps until reaching a predetermined value.

14. A method of reducing the frequency spectrum consumed by the instantaneous changes in a digital data stream comprising:

generating a sequence of specified steps;

storing a plurality of values that determine the shape of the transition signal between pulses of said digital data stream in a memory means;

feeding said specified steps into said memory means;

feeding the output from said memory means to an adder;

feeding the output of said adder to a phase accumulator that contains a plurality of phase values relating to the shape of said transition signal; and stepping through an entire cycle of said plurality of values by counting through a plurality of specified steps until reaching a predetermined value.

15. A method of reducing the frequency spectrum consumed by the instantaneous changes in a digital data stream comprising:

generating a sequence of specified steps;

storing a plurality of values that determine the shape of the transition signal between pulses of said digital data stream in a memory means;

feeding said specified steps into said memory means;

feeding the output from said memory means to an adder;

feeding an output of a phase accumulator to an input of said phase accumulator; and stepping through an entire cycle of said plurality of values by counting through a plurality of specified steps until reaching a predetermined value.

16. The method according to claim 15 further comprising the steps:

of storing a plurality of amplitude values in a sign lookup table;

feeding the output of said accumulator into the sine lookup table; and relating the output of said accumulator to an amplitude value in said lookup table.

17. The method according to claim 16 further comprising the step of feeding the output of said sine lookup table into a digital-to-analog converter circuit.

18. The method according to claim 17 further comprising the step of recreating a sine waveform using a current phase value and corresponding amplitude value.

19. A single chip synthesizer/transmitter/modulator for high speed GSM application comprising:

a modified Direct Digital Synthesizer with internal spectrum shaping with slew rate control, said DDS having an input terminal that receives a digital data stream and an output terminal with a shaped FSK waveform;

a phase comparator coupled to the output of said DDS and configured to compare the phase difference between the DSS output and the output of a frequency shifter, said frequency shifter coupled to the output of said phase comparator;

a loop filter coupled to the output of said comparator and used to filter out any unwanted aliases; and a voltage controlled oscillator coupled to the output of said loop filter and providing a GMSK output at a predetermined channel frequency.

20. The single chip synthesizer/transmitter/modulator according to claim 19 wherein said digital data stream originates from a digital signal processor capable of generating a bit stream data representation of an audio speech pattern.

21. The single chip synthesizer/transmitter/modulator according to claim 19 wherein the output of said DDS serves as a modulated reference signal to the chip.

22. A method of reducing the slew rate in transition from a first RF frequency to a second RF frequency comprising:

generating a digital transition ramp;

determining at least one digital value which is a function of instantaneous amplitude of said first frequency;

combining said transition ramp and said at least one digital value which is a function of instantaneous amplitude of said first frequency to generate a series of steps;

correlating a corresponding series of phase values by sequential accumulation of said steps;

assigning an analog signal amplitude counterpart to each of said phase values; and using said steps to control an analog to digital converter to generate a controlled transition from said first RF frequency to said second RF frequency.

23. In a frequency modulation system, a method of smoothing out the transition between a "mark" pulse and a "space" pulse to reduce the frequency spectrum consumed by instantaneous changes in said pulses, said method comprising the steps of generating a series of steps that fit within the amplitude range defined by said "mark" pulse and said "space" pulse;

the series of steps correlating to a corresponding series of phase values by sequential accumulation of said steps;

assigning an analog signal amplitude counterpart to each of said phase values; and generating an RF waveform having amplitude values and phase values as calculated.

* * * * *